United States Patent [19]

Hines et al.

[11] Patent Number: 5,235,854
[45] Date of Patent: Aug. 17, 1993

[54] DYNAMIC BALANCING DUAL POSITION DRIVE ARM

[75] Inventors: Gordon E. Hines; Vernon J. Burzan, both of Ann Arbor; Lee D. Case, Monroe; Thad Hosford, Ann Arbor, all of Mich.

[73] Assignee: Hines Industries, Inc., Ann Arbor, Mich.

[21] Appl. No.: 621,516

[22] Filed: Dec. 3, 1990

[51] Int. Cl.[5] .............................................. G01M 1/06
[52] U.S. Cl. .......................................... 73/462; 73/487
[58] Field of Search ................ 73/460, 462, 471, 475, 73/476, 487

[56] References Cited

U.S. PATENT DOCUMENTS 3,805,624  4/1974  Martin .................................... 73/462
4,262,536  4/1981  Orem et al. ............................ 73/462

FOREIGN PATENT DOCUMENTS

58-162827  9/1983  Japan .................................... 73/462

*Primary Examiner*—John E. Chapman
*Attorney, Agent, or Firm*—Emch, Schaffer, Schaub & Porcello Co.

[57] ABSTRACT

The invention provides an improved unbalance measuring machine wherein the drive member for imparting rotational forces to the workpiece has two distinct positions of engagement with the workpiece. A first position is used to maintain minimal contact with the workpiece and maintain a steady-state rotation of the workpiece. A second position is used to impart additional rotational forces to the workpiece for the purposes of accelerating, decelerating and indexing the workpiece.

12 Claims, 8 Drawing Sheets

DYNAMIC BALANCING DUAL POSITION DRIVE ARM

BACKGROUND OF THE INVENTION

The present invention relates generally to the field of balancing technology. More specifically, the invention incorporates a dual-position drive member into a dynamic balancing machine for imparting rotational forces to a rotating workpiece during dynamic balancing operations involving the workpiece. In dynamic balancing operations, a workpiece is usually rotated at high speeds. Sensors mounted on or attached proximate the bearing points of the workpiece detect any vibrational forces and transmit a signal to a processor, the signal being used to determine the amount and location of any unbalance in the rotating mass of the workpiece.

A machine used in the dynamic balancing of a workpiece usually includes a base having a cradle system for supporting the workpiece during the balancing operation. The base and cradle members are constructed of a substantial enough mass that external vibrational forces encountered by the base and cradle system are sufficiently damped to eliminate unwanted interference while sensing vibrational imbalance in the rotating workpiece. The sensors utilized for locating the unbalance in the workpiece are generally provided in combination with highly sensitive resilient mounts on the cradle members. Since the base and cradle system are relatively stable, the sensors are intended to primarily receive vibrational input from the unbalance in the workpiece. However, the drive system used to impart the rotational forces to the workpiece during the balancing operations remains the only balancing machine structure in dynamic contact with the workpiece during the critical measuring step of the balancing operation. If the drive system has some imbalance, the accuracy of the unbalance measurements taken by the sensors may adversely affected.

There are several important functions for which it is necessary to account, when designing the drive system for a dynamic balancing machine. The drive system must be able to apply the rotational forces to the workpiece, usually through contact friction, in order to accelerate the workpiece to an acceptable balancing speed. The drive system must also be able to maintain the rotation of the workpiece at a steady-state speed throughout the time required for the sensors to measure the vibrational forces and detect the amount and angle of unbalance. The drive system must also be able to rapidly decelerate the workpiece to a stop. Finally, when used in an automatic or semi-automatic balancing operation, the drive system must also be able to accurately and rapidly index the workpiece to a predetermined position for the correction procedure.

Since the drive system maintains contact with the workpiece throughout the balancing operation, any vibration developed in the drive system or in the engagement between the drive system and the workpiece will be transmitted through the workpiece to the sensors. Since this drive system-induced vibration is not a true component of the workpiece unbalance forces being measured by the sensors, the drive system-induced vibration jeopardizes the accuracy and resolution of the unbalance readings. This drive system vibration cannot be easily taken into account through electronic signal manipulation as it does not remain constant. Deterioration and wear of the drive system components, such as belt deterioration and bearing wear, greatly affects the repeatability in the unbalance measurement operations. Therefore, it is imperative to reduce as much as possible the influence of any drive system vibration on the unbalance measuring step in dynamic balancing operations.

It has been found that the drive system-induced vibration can be reduced by either decreasing the contact area between the drive system and the workpiece or decreasing the forces applied to the workpiece by the drive system. However, the reduction in drive-induced vibration achieved by these methods is usually offset by a loss of workpiece processing speed due to the creation of longer acceleration and deceleration times as well as a real loss of accuracy in indexing the workpiece for correction.

Other attempts to reduce the impact of drive-system-induced vibration on the unbalance measuring step have resulted in machine designs wherein the workpiece is accelerated by a drive belt or wheel to a desired rotational speed, at which point the drive wheel or belt is completedly disengaged from the rotating workpiece. The unbalance measurement is then taken on the coasting workpiece. While such a machine is effective in given balancing operations, there are a plethora of appications and workpieces where a continuous drive is demanded to maintain the rotational speed of the workpiece at a steady-state during the unbalance measuring step. The unbalance measuring step may last as long as four to six seconds and the rotational speed of a coasting workpiece can slow considerably over that interval.

The present invention is directed toward achieving a steady-state rotational speed and a reduction in the drive system-induced vibration during the measurement portion of the balancing cycle while maintaining an acceptable processing standard for acceleration and deceleration times as well as maintaining the indexing accuracy in automatic and semi-automatic balancing systems.

SUMMARY OF THE INVENTION

The invention provides an improved apparatus for measuring the unbalance of a rotating workpiece wherein the workpiece drive system is designed to engage the workpiece in at least two distinct positions, thereby varying the amount of contact and/or force applied to the workpiece by the drive system. When the balancing operation is in a non-critical rotational stage such as the acceleration, deceleration, or indexing phases of the cycle, a large amount of rotational force is transmitted to the workpiece. This is accomplished either by increasing the contact area between the drive system and the workpiece or by increasing the contact force of the drive system on the workpiece or a combination of both. The increase in contact area or contact force succeeds in decreasing the time necessary to perform the acceleration, deceleration, and indexing phases of the balancing operation, thus decreasing the overall cycle time. During the critical stage of unbalance measurement in the balancing operation, the drive system decreases the contact area and/or contact force applied to the workpiece to an amount solely sufficient to maintain the rotational speed of the workpiece at a steady state. By greatly reducing the contact area or contact force applied to the workpiece, the potential for drive-induced vibration is substantially reduced during the critical unbalance measuring phase.

The apparatus of the present invention can be more fully understood by reference to the accompanying drawings and the following detailed description of those drawings.

DETAILED DESCRIPTION OF THE DRAWINGS

Figure 1:
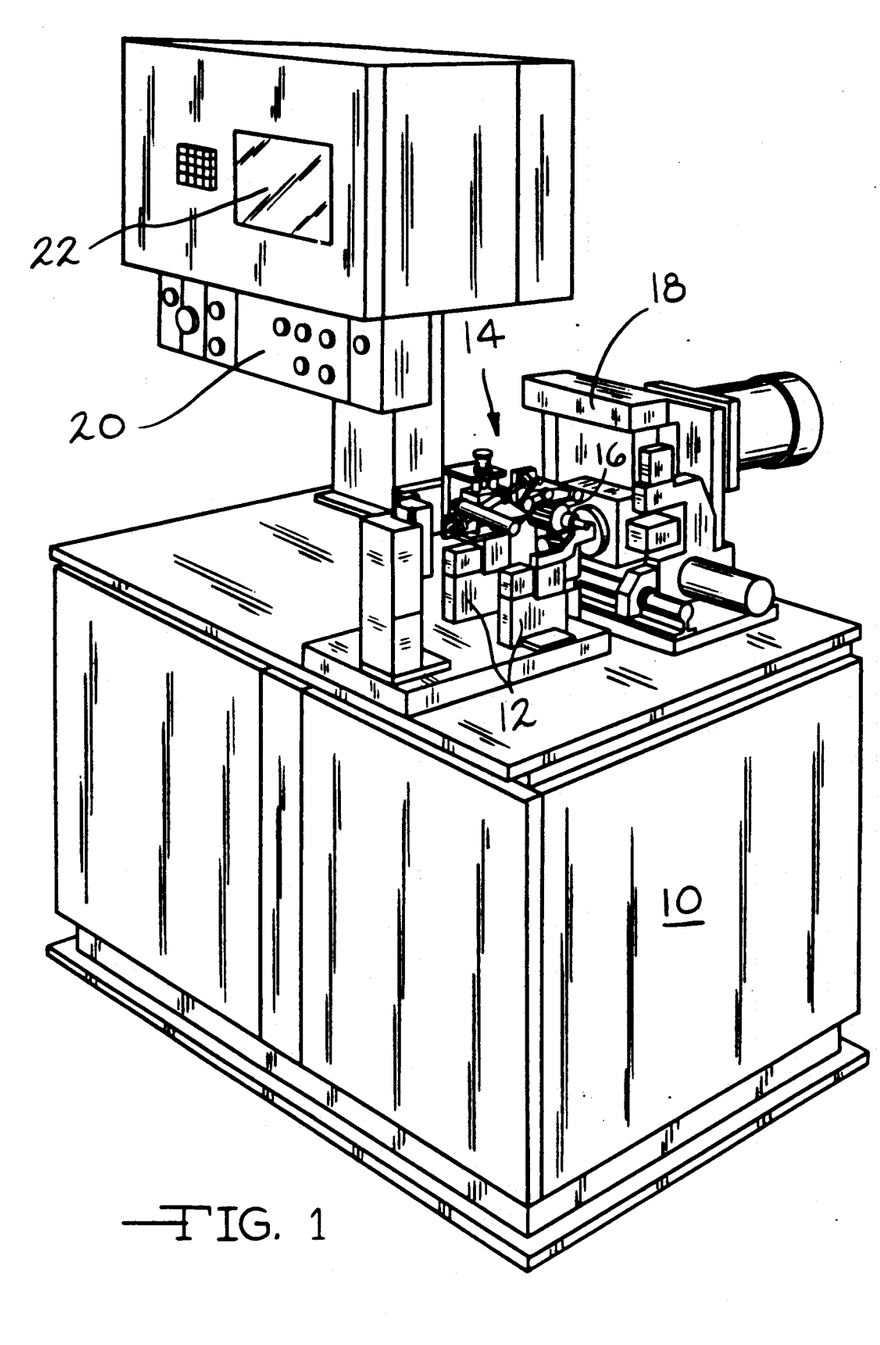
FIG. 1 is a perspective view of an unbalance measuring apparatus of the present invention.

The present invention relates to an improved apparatus for use in the measuring of the unbalance of a rotating workpiece. Specifically the invention provides an improved drive member for imparting rotational forces to the workpiece and is intended to be utilized with any design of a dynamic balancing machine wherein rotational motion must be imparted to a workpiece during the balancing operation. Referring to FIG. 1, a typical unbalance measuring machine is shown having a base 10 which supports a pair of cradle members 12. The cradle members 12 include sensors (not shown) which are resiliently mounted to enable them to experience and capture any vibrational forces or motions which may be imparted to the cradle members 12 by the supported workpiece, in this case an armature A. A drive member 14 is fixed to the base 10 proximate the cradle members 12 and includes a cantilevered drive arm 16 designed to engage the armature A and impart rotational forces to the armature A during the various stages of the unbalance measuring cycle. The balancing machine of FIG. 1 is an automatic or semi-automatic machine which includes a material removal or addition device 18 positioned proximate the armature A to provide the necessary correcting steps to eliminate any measured unbalance in the rotating workpiece. Also, as shown in FIG. 1, most unbalance measuring machines include a microprocessor 20 and display terminal 22 for assisting the operator in setting the machine up and providing information regarding the amounts and location of unbalance in the workpiece. The balancing machine of FIG. 1 is shown to provide a background for the description of the present invention, the drive member 14. It is intended that the drive member 14 invention can be utilized with other dynamic balancers of differing design without departing from the spirit of the invention.

The drive member 14 functions in at least two stages or two distinct positions when imparting rotational forces to the workpiece. The first position for the drive member 14 will impart high forces to or contact a substantial amount of surface area of the workpiece to facilitate the timely and accurate acceleration, deceleration and indexing of the workpiece. The second position for the drive member 14 enables the drive member 14 to maintain a steady-state rotational motion for the workpiece while successfully imparting minimal force to the workpiece and maintaining minimal contact with the workpiece. The second position for the drive member 14 thereby reduces the risk of introduction of component vibration from the drive member 14 to the workpiece during the critical phase of measuring the amount of unbalance in the workpiece.

Figure 2:
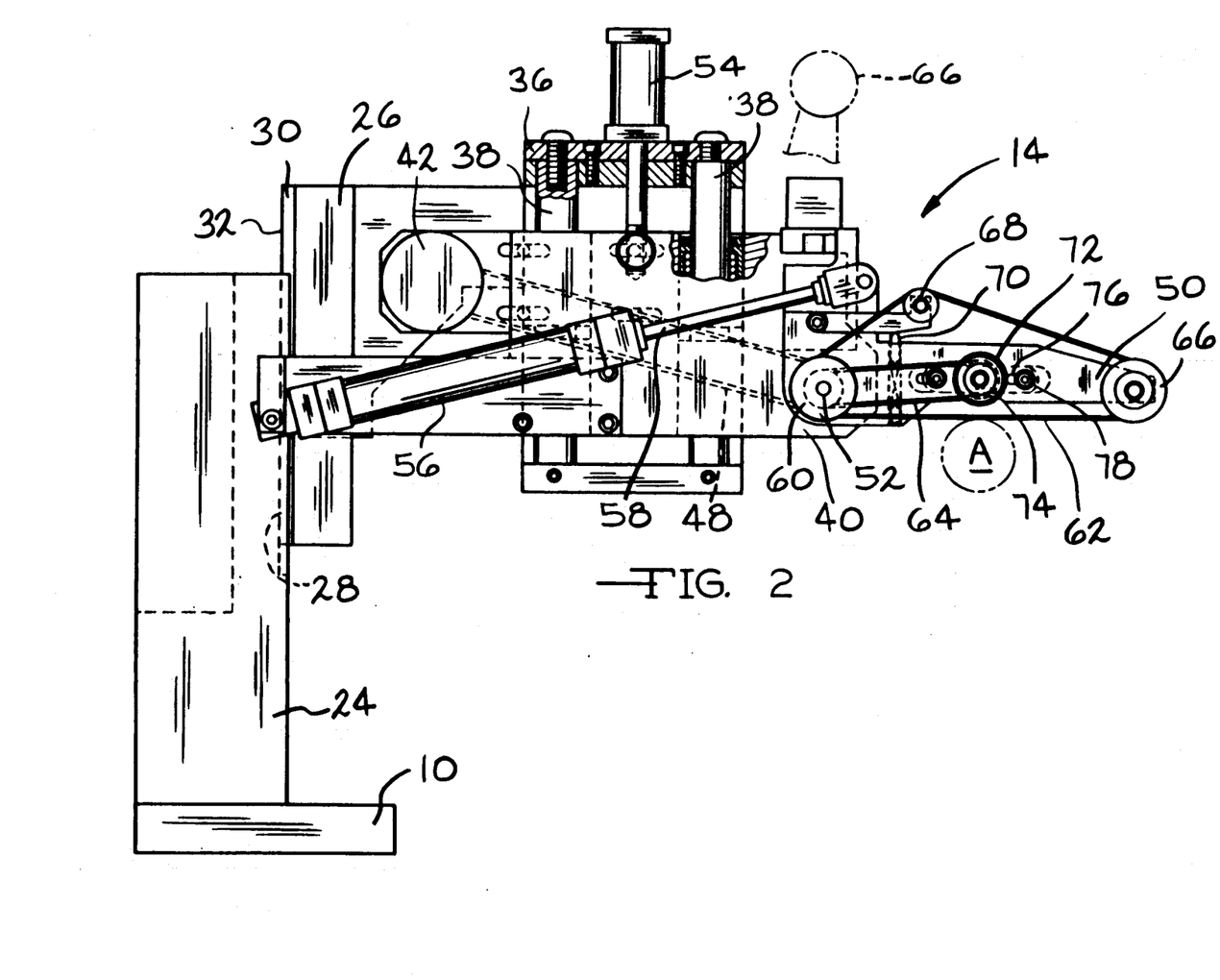
FIG. 2 is a side view of the preferred embodiment of the drive member of the unbalance measuring apparatus of the present invention.
Figure 3:
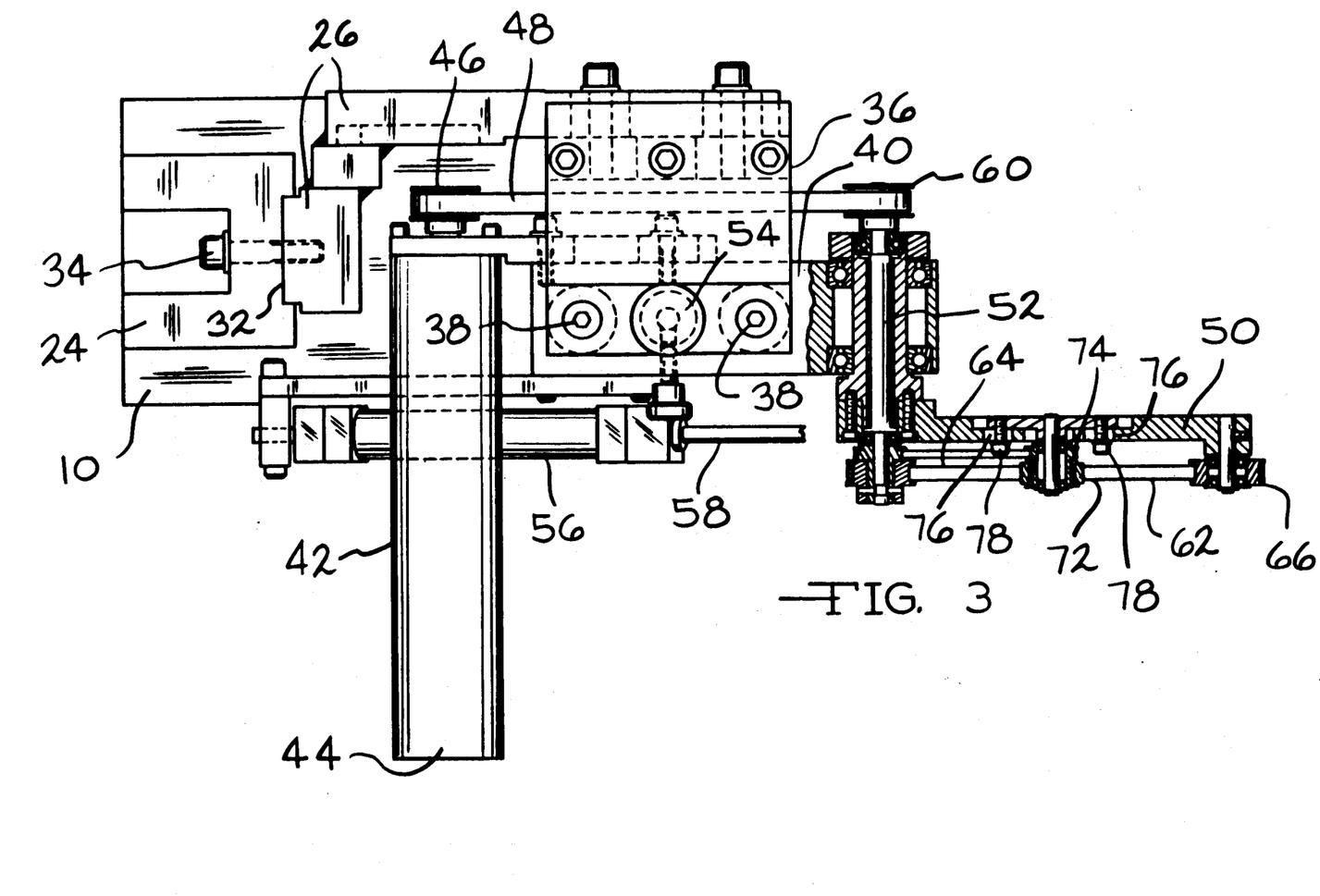
FIG. 3 is a top view of the drive member of FIG. 2.
Figure 4:
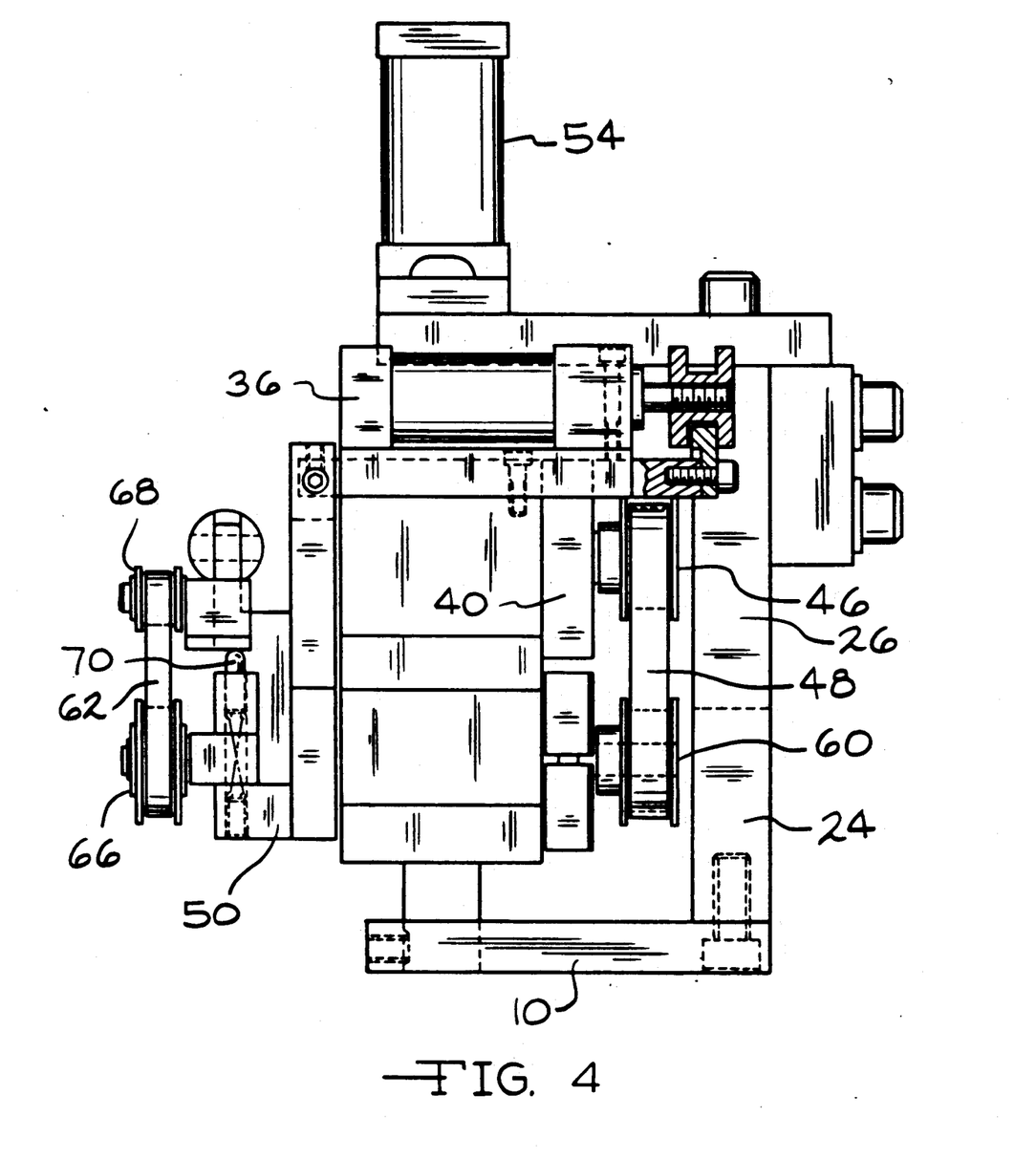
FIG. 4 is a front view of the drive member of FIG. 2.

Referring now to FIGS. 2, 3 and 4, the preferred embodiment of the drive member 14 of the present invention is shown. A support stand 24 is firmly fixed to the base 10 of the balancing machine. A support arm 26 is engaged with the support stand 24 and extends away from the support stand 24 in a generally cantilevered position. The support stand 24 includes a slide groove 28 designed to mate with a slide tongue 30 located on the engagement surface 32 of the support arm 26. The slide tongue 30 and groove 28 coupling provides for a rough adjustment of the position of the support arm 26 so as to accommodate various sizes and diameters of workpieces A. Bolt members 34 are used to tighten the support arm 26 to the support stand 24 once the support arm 26 is in its proper vertical alignment with respect to the workpiece A.

The cantilevered end of the support arm 26 which is opposed to the support stand 24 carries a housing 36 which contains a ball slide unit 38. A drive arm 40 is engaged with the ball slide unit 38 and is driven in the axial direction of the ball slide unit 38. A servo-controlled motor 42 with an encoder unit 44 is fixed to the drive arm 40. The encoder unit 44 is useful in tracking the rotational movement of the workpiece A. A drive pulley 46 carrying a primary drive belt 48 is fixed to the shaft end of the motor 42. In the preferred embodiment, a position-responsive cylinder 54 is located within the housing 36 and operates to adjust the position of the drive arm 40 with respect to the workpiece A through the movement of the ball slide unit 38.

A workpiece engagement member 50 is carried by the drive arm 40 and is fixed to the drive arm 40 with a pivot bearing 52. The pivot bearing 52 allows the workpiece engagement member 50 to be rotated out of engagement with the workpiece A to the position shown in ghost in FIG. 2, thereby clearing the workpiece A during the workpiece loading and unloading segments of the balancing operation. An engagement cylinder 56 with piston 58 is fixed between the workpiece engagement member 50 and the drive arm 40 to move the workpiece engagement member 50 through its positions of engagement and non-engagement with the workpiece A.

The workpiece engagement member 50 includes a primary drive pulley 60 which is engaged with the primary drive belt 48 and is driven via the engagement by the servo-controlled motor 42. The primary drive pulley 60 is adapted to carry two more belts: the engagement belt 62 and the drive wheel belt 64.

The engagement belt 62 extends from the primary drive pulley 60 to an idler pulley 66 and a belt tensioning pulley 68. The engagement belt 62 remains in contact with the workpiece A at all times during the balancing operation. An adjustment screw 70 is provided to move the belt tensioning pulley 68 in incremental amounts to maintain the tension in the engagement belt 62 at a desirable level.

A drive wheel 72 engaged with a drive wheel pulley 74 is mounted on the workpiece engagement member 50 and is driven by the drive wheel belt 64 which is engaged between the primary drive pulley 60 and the drive wheel pulley 74. The mounting area for the drive wheel 72 consists of a pair of slots 76 through which mounting bolts 78 retain the drive wheel 72 to the workpiece engagement member 50. The slots 76 provide the needed flexibility for tensioning the drive wheel belt 64. In the preferred embodiment, the primary drive pulley 60, the idler pulley 66, the belt tensioning pulley 68, and the drive wheel pulley 74 are all sized to provide coordinated surface speeds between the drive wheel 72 and the engagement belt 62.

Figure 10:
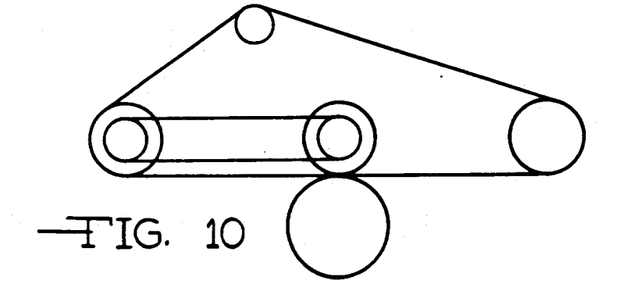
FIG. 10 is a schematic representation of the drive engagement of the apparatus of FIG. 2 in its first position.
Figure 11:
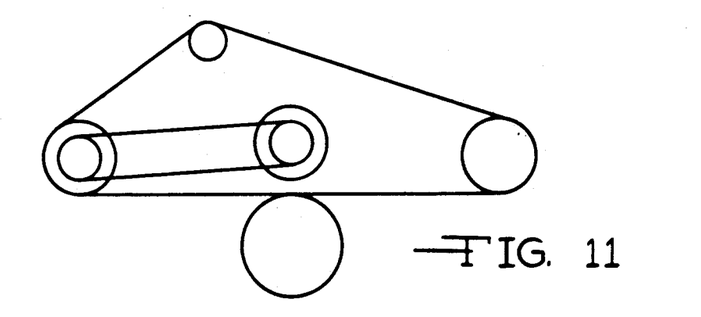
FIG. 11 is a schematic representation of the drive engagement of the apparatus of FIG. 2 in its second position.

In operation, the drive member 14 shown in FIGS. 2, 3 and 4 performs as follows. During the loading and unloading of a workpiece A onto the cradle member 12, the engagement cylinder 56 and piston 58 are activated to raise the workpiece engagement member 50 to a position (shown in ghost in FIG. 2) which clears the area around the cradle members 12. Once the workpiece A is positioned on the cradle members 12, the engagement cylinder 56 and piston 58 lower the engagement member 50 to a substantially horizontal position. When in this final position, the engagement belt 62 tangentially contacts the workpiece periphery as shown in FIG. 11. If the engagement belt 62 is not in its preferred position, the drive cylinder 54 can be activated to better position the drive arm 40 by operating the ball slides 38 to place the engagement belt 62 in its desired position. To accelerate the workpiece A up to its balancing speed, the drive cylinder 54 continues to press the workpiece engagement member 50 supported by drive arm 40 onto the workpiece A until the engagement belt 62 slightly wraps the periphery of the workpiece A and the drive wheel 72 engages either the surface of the workpiece A or the engagement belt 62 as shown in FIG. 10. The servo-controlled motor 42 is then activated and the workpiece A is accelerated to the predetermined rotational speed for the unbalance measuring step.

Once the workpiece A is at its desired rotational speed, the drive cylinder 54 is activated to remove the drive wheel 72 from engagement with the workpiece A, leaving the engagement belt 62 in tangential contact with the workpiece A as shown in FIG. 11 and providing enough rotational force to the workpiece A to maintain a steady-state rotational speed during the unbalance measurement step. After the unbalance measurement is complete, the drive wheel 72 is again pressed into communication with the workpiece A as shown in FIG. 10 and the workpiece A is decelerated to a stop for removal. If the balancing machine is a semi-automatic or automatic machine and includes a correction device, the drive wheel 72 and engagement belt 62 are activated by the servo-motor 42 to index the workpiece A to a specific position designated by the encoder 44 for the correction step. After the correction step is completed, the workpiece A is accelerated back to its desired steady-state rotational speed for an audit of the accuracy of the correction step. Once the steady-state rotational speed is achieved, the drive cylinder 54 is activated to remove the drive wheel 72 from engagement with the workpiece A, once again leaving the engagement belt 62 in tangential contact with the workpiece A. If the workpiece A is balanced within tolerance by the correction step, the workpiece engagement member 50 is then rotated out of engagement with the workpiece A to clear the cradle 12 members for removal of the workpiece A. If the workpiece A is not yet balanced within tolerance, the above-described correction cycle is again begun. In the preferred embodiment of the invention, the workpiece A will have two opportunities to achieve tolerance before it is rejected, however, the cycle may be continued as many times as is desirable.

Figure 5:
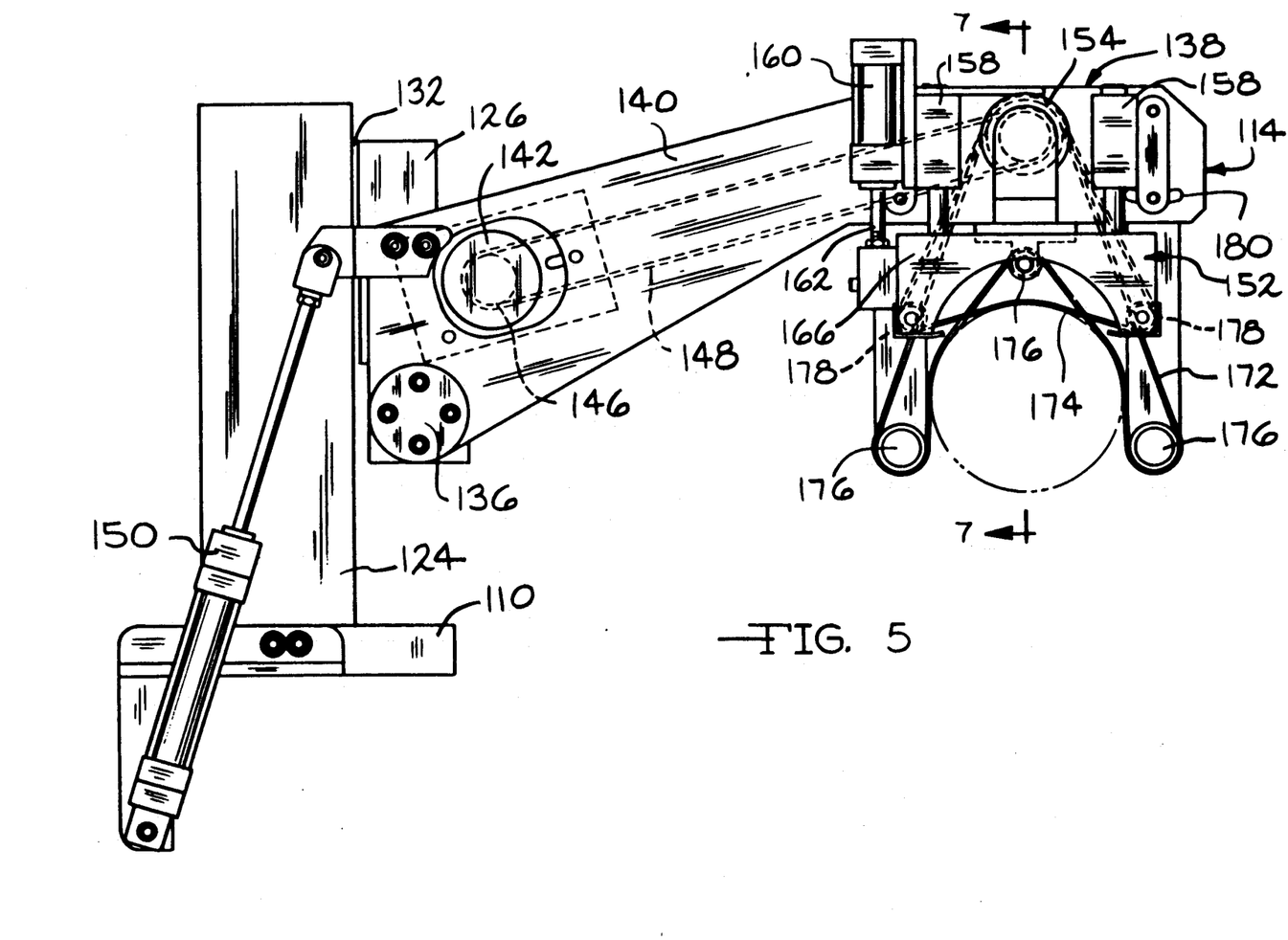
FIG. 5 is a side view of an alternative embodiment of the drive member of the unbalance measuring apparatus of the present invention.
Figure 6:
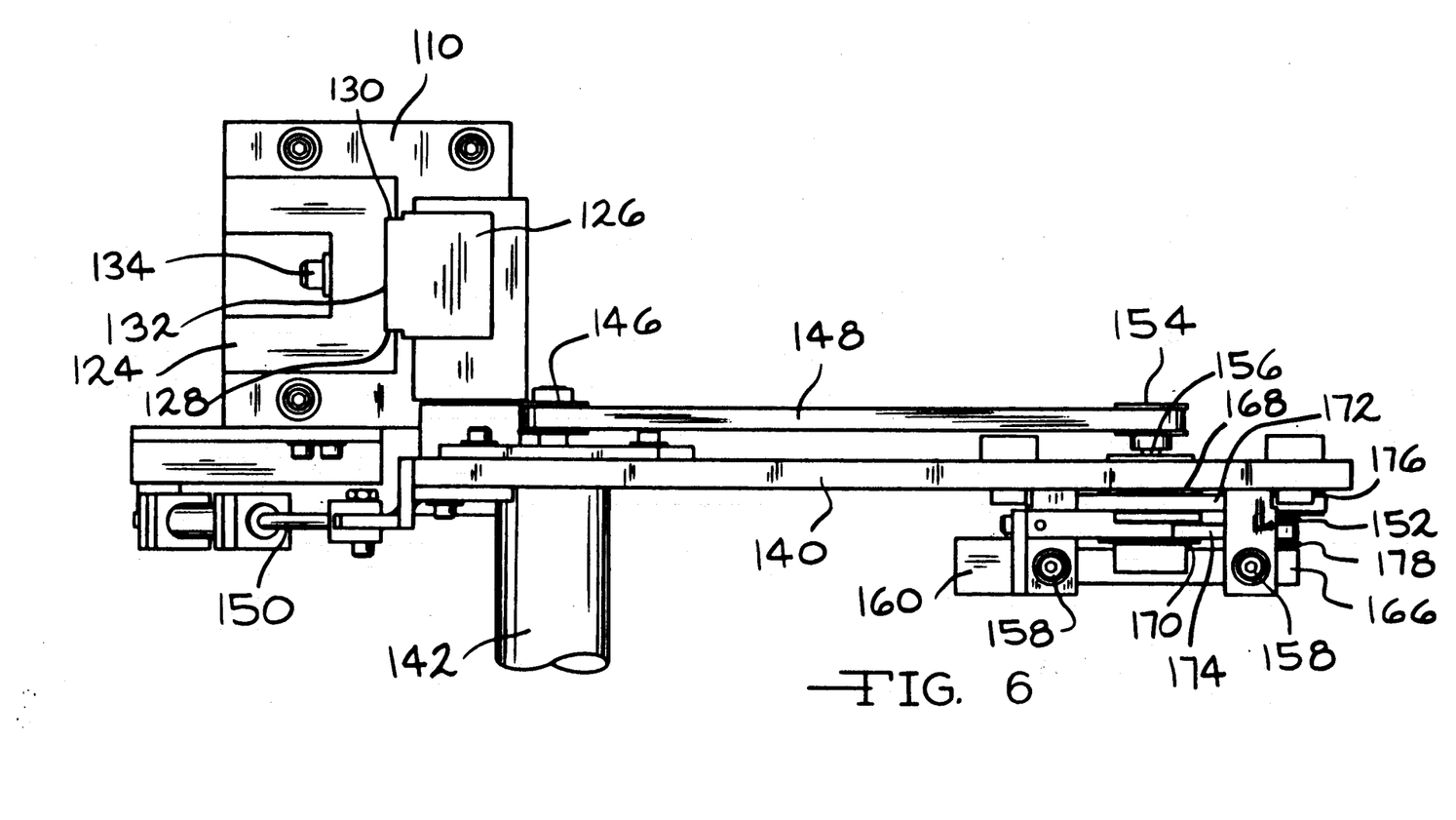
FIG. 6 is a top view of the drive member of FIG. 5.
Figure 7:
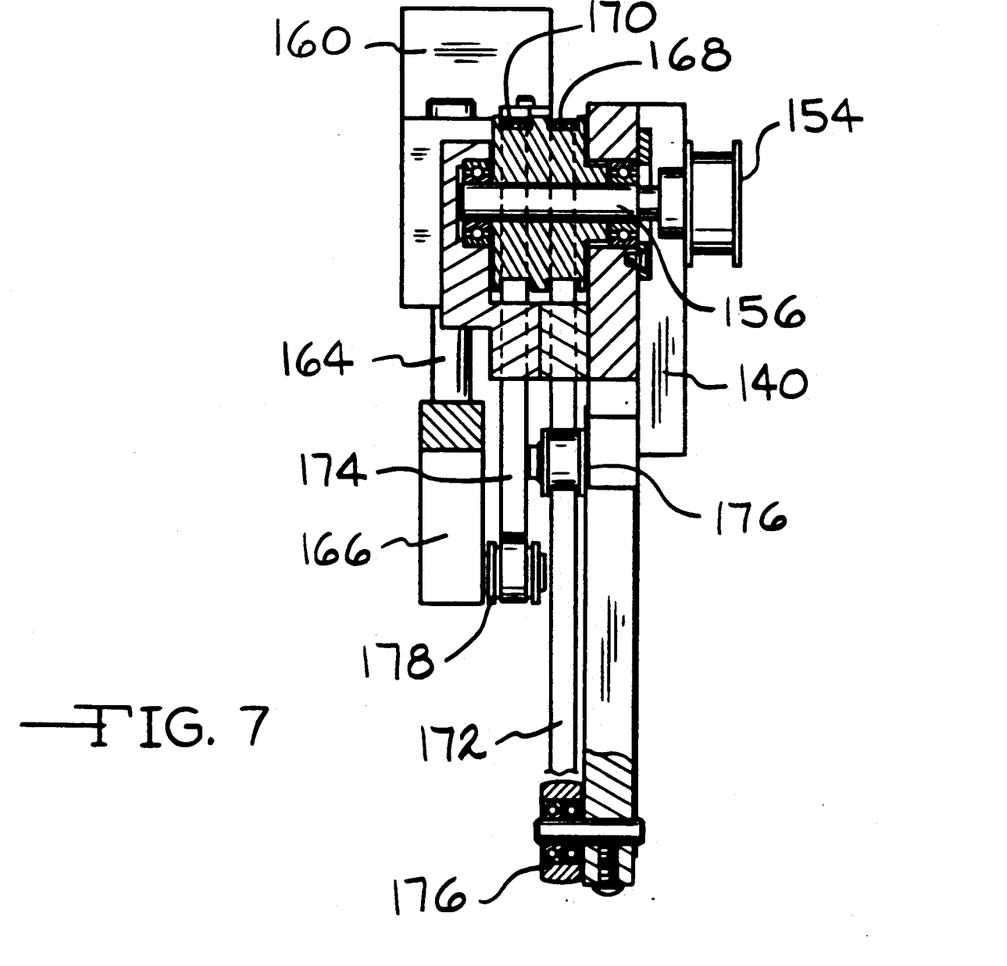
FIG. 7 is a front view of the drive member of FIG. 5.

Referring now to FIGS. 5, 6 and 7, an alternative embodiment of the drive member 114 of the present invention is shown. A support stand 124 is firmly fixed to the base 110 of the balancing machine. A support arm 126 is engaged with the support stand 124 and extends away from the support stand 124. The support stand 124 includes a slide groove 128 designed to mate with a slide tongue 130 located on the engagement surface 132 of the support arm 126. The slide tongue 130 and groove 128 coupling provides for a rough adjustment of the position of the support arm 126 so as to accommodate various sizes and diameters of workpieces A. Bolt members 134 are used to tighten the support arm 126 to the support stand 124 once the support arm 126 is in its proper alignment with respect to the workpiece A.

The support arm 126 includes a pivot bearing member 136 to which is attached a drive arm unit 140. The drive arm unit 140 is cantilevered away from the support stand 124 and support arm 126. A cylinder and piston member 150 is engaged between the drive arm 140 and the support stand 124. When activated, the cylinder and piston unit 150 will cause the drive arm 140 to rotate about the pivot bearing member 136 to remove the drive member 114 from the proximity of the cradle member (not shown) to clear the cradle area and facilitate the loading and unloading of workpiece A.

The drive arm 140 carries a servo-controlled motor 142 with an encoder unit 144. The encoder unit 144 is useful in tracking the rotation movement of the workpiece A. A drive pulley 146 carrying a primary drive belt 148 is fixed to the shaft end of the servo controlled-motor 142.

The cantilevered end of the drive arm 140 supports a ball slide unit 138. The carriage 152 of the ball slide unit 138 is fixed to the cantilevered end of the drive arm 140. The carriage 152 includes means for mounting at least two ball slides 158 and a drive cylinder 160. An engagement head 166 is fixed to the piston 162 of the drive cylinder 160 and the slide members 164 of the ball slides 158. The engagement head 166 carries a primary drive pulley 154 which is attached to a shaft member 156. The primary drive pulley 154 is engaged by the primary drive belt 148 extending from the drive pulley 146 attached to the servo-motor 142. Also attached to the shaft member 156 of the primary drive pulley 154 are a secondary drive pulley 168 and tertiary drive pulley 170. A secondary drive belt 172 is positioned on the carriage member 152 and is carried by the secondary drive pulley 168, and idler pulleys 176. A tertiary drive belt 174 is mounted on the carriage member 152 and is carried by the teritary drive pulleys 170 and the idler pulleys 178. The secondary drive belt 172 is in constant communication with the surface of the workpiece A. In the preferred embodiment, the ball slides 158 and drive cylinder 160 are mounted in arcuate slot members 180 to allow for positioning of the drive belts 172, 174 about the workpiece A.

Figure 8:
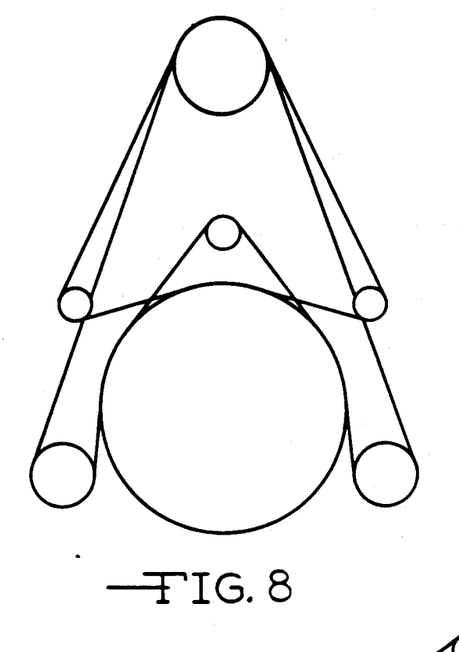
FIG. 8 is a schematic representation of the belt engagement of the drive apparatus of FIG. 5 in its first position.
Figure 9:
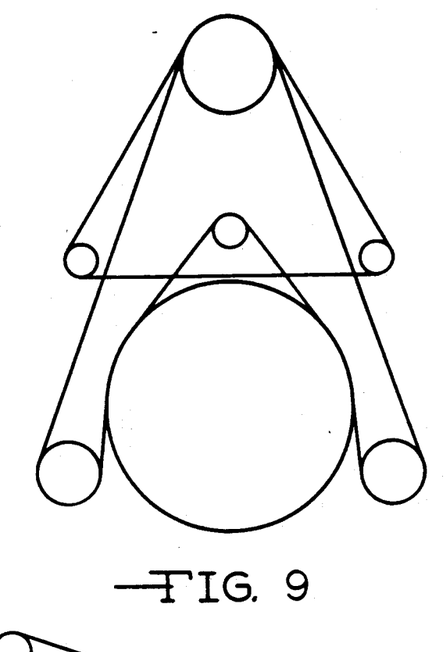
FIG. 9 is a schematic representation of the belt engagement of the drive apparatus of FIG. 5 in its second position.

In operation, the drive member 114 shown in FIGS. 5, 6 and 7 performs as follows. During the loading and unloading of a workpiece A onto the cradle members, the cylinder and piston 150 rotate the drive member 114 away from the cradle area to facilitate the loading of a workpiece A. Once the workpiece is positioned in the cradle members, the cylinder and piston 150 lower the drive arm 140 to place the carriage 152 carrying the secondary and tertiary drive belts 172, 174 over the workpiece A. The secondary drive belt 172 is in communication with the workpiece A at all times as shown in FIG. 9. The drive cylinder 160 is activated to lower the engagement head 166 of the carriage 152 toward the workpiece A until the tertiary drive belt 174 comes into engagement with the workpiece A as shown in FIG. 8. As the engagement head 166 is moving toward the workpiece A, the secondary drive belt 172 wraps a greater amount of surface area of the workpiece A. Therefore, once the tertiary drive belt is in engagement with the surface of the workpiece A there is a substantial amount of surface area of the workpiece A engaged by both the secondary drive belt 172 and the tertiary drive belt 174 as shown in FIG. 8. The servo controlled motor 142 is then activated to drive the primary drive pulley 154 and cause the secondary drive belt and tertiary drive belt 172, 174 to accelerate the workpiece A to the desired rotational speed for the unbalance measurement operation.

Once the workpiece A has reached its desired rotational speed, the drive cylinder 160 and piston 162 move the engagement head 166 away from the workpiece A disengaging the tertiary drive belt 174 from engagement with the workpiece A as shown in FIG. 9. The secondary drive belt is now in a position to maintain minimal contact with the workpiece A. In this position, the unbalance measurement is taken of a steady-state rotating workpiece A. Once the unbalance measurement is completed, the engagement head 166 is again moved toward the workpiece A re-engaging the tertiary drive belt 174 and secondary drive belt 172 over a greater surface area of the workpiece A as shown in FIG. 8. The workpiece A is then decelerated to a stop. If the balancing machine is a semi-automatic or automatic machine and includes a correction device, the tertiary drive belt 174 and secondary drive belt 172 are activated by the servo-motor 142 to index the workpiece A to a specific position designated by the encoder 144 for the correction step. Once the workpiece A is balanced within tolerance the workpiece engagement head 166 is disengaged from the workpiece A and the drive arm 140 is rotated by the cylinder and piston assembly 150 to remove the engagement head 166 from the proximity of the workpiece A and cradle member. The workpiece can then be removed from the cradle members.

The above description of the present invention is intended to be used for illustrative purposes and is not intended to be limiting upon the scope and content of the following claims.

We claim:

1. An apparatus for measuring the unbalance of a rotating workpiece comprising, in combination:
cradle means for supporting the workpiece;
sensing means for measuring the amount and location of any unbalance in the workpiece during rotation;
drive means including a first belt member engaged about at least two pulley members, a first motor and encoder means engaged with at least one of said pulley members, and means for moving said first belt member from a position of non-engagement with the workpiece to a first position of engagement for substantially tangentially engaging the workpiece to drive the workpiece at a constant rotational speed and a second belt member engaged about at least two second pulley members, a second motor and encoder means engaged with at least one of said second pulley members, and means for placing said second belt member into engagement with the workpiece at an additional more substantial position of engagement; and
a display means for communicating the amount and location of any rotational imbalance in the workpiece.

2. An apparatus for measuring the unbalance of a rotating workpiece comprising, in combination:
cradle means for supporting the workpiece;
sensing means for measuring the amount and location of any unbalance in the workpiece during rotation;
drive means for imparting rotation to the workpiece, said drive means including a first belt member engaged about at least two pulley members, a drive motor in communication with at least one of said pulley members, a means for moving said first belt member from a position of non-engagement with the workpiece to a first position of engagement with the workpiece; and a second belt member engaged about at least two second pulley members, said drive motor being in communication with at least one of said second pulley members, and means for placing said second belt member into engagement with the workpiece at at least one additional position of engagement; and,
a display means for communicating the amount and location of any rotational unbalance with the workpiece.

3. An apparatus for measuring the unbalance of a rotating workpiece comprising, in combination:
cradle means for supporting the workpiece;
sensing means for measuring the amount and location of any unbalance in the workpiece during rotation;
drive means for imparting rotation to the workpiece, said drive means including a belt member engaged about at least two pulley members, a drive motor engaged with at least one of said pulley members, said belt member being in continuous engagement with the workpiece; a drive wheel member also in communication with said drive motor, a means for moving said drive wheel member from a position of non-engagement with the workpiece to a position where said wheel member imparts rotational driving forces to the workpiece along with said belt member; and
a display means for communicating the amount and location of any rotational imbalance in the workpiece.

4. The unbalance measuring apparatus of claim 3, wherein said wheel member engages with said belt member to impart rotational driving forces to the workpiece.

5. The unbalance measuring apparatus of claim 3, wherein said drive wheel member engages the workpiece and imparts rotational driving forces to the workpiece along with said drive belt.

6. The unbalance measuring apparatus of claim 3, wherein said pulley members move as said wheel member moves from a position of non-engagement to its position of imparting rotational forces to the workpiece, thereby moving said belt member from a first position of continuous engagement with a portion of the workpiece to an additional position of more substantial engagement with the workpiece.

7. An apparatus for measuring the unbalance of a rotating workpiece comprising, in combination:
   cradle means for supporting the workpiece;
   sensing means for measuring the amount and location of any unbalance in the workpiece during rotation;
   drive means for imparting rotation to the workpiece, said drive means including a belt member engaged about at least two pulley members, a drive motor engaged with at least one of said pulley members, said belt member being in continuous engagement with the workpiece; a drive wheel member in communication with a second drive motor, a means for moving said drive wheel member from a position of non-engagement with the workpiece to a position where said wheel member imparts rotational driving forces to the workpiece along with said belt member; and
   a display means for communicating the amount and location of any rotational imbalance in the workpiece.

8. The unbalance measuring apparatus of claim 7, wherein said pulley members move as said wheel member moves from a position of non-engagement to its position of imparting rotational forces to the workpiece, thereby moving said belt member from a first position of continuous engagement with a portion of the workpiece to an additional position of more substantial engagement with the workpiece.

9. An apparatus for measuring the unbalance of a rotating workpiece comprising, in combination:
   cradle means for supporting the workpiece;
   sensing means for measuring the amount and location of any unbalance in the workpiece during rotation;
   drive means for imparting rotation to the workpiece, said drive means including a first drive member in communication with a drive motor, means for moving said drive member from a position of non-engagement with the workpiece to a first position of engagement with the workpiece; and at least one additional drive member in communication with said drive motor, means for placing said additional drive member into engagement with the workpiece in at least one additional position of engagement; and,
   a display means for communicating the amount and location of any rotational unbalance with the workpiece.

10. The unbalance measuring apparatus of claim 9, wherein said additional drive member is positioned to substantially tangentially engage the workpiece.

11. An apparatus for measuring the unbalance of a rotating workpiece comprising, in combination:
   cradle means for supporting the workpiece;
   sensing means for measuring the amount and location of any unbalance in the workpiece during rotation;
   drive means for imparting rotation to the workpiece, said drive means including a first drive member engaged with a drive motor, said first drive member being in continuous engagement with the workpiece; a second drive member also in communication with said drive motor, and means for moving said second drive member from a position of non-engagement with the workpiece to a position where said second drive member imparts rotational driving forces to the workpiece along with said first drive member; and,
   a display means for communicating the amount and location of any rotational imbalance in the workpiece.

12. The unbalance measuring machine of claim 11, wherein said second drive member is positioned to substantially tangentially engage the workpiece.

* * * * *